Figure 1:
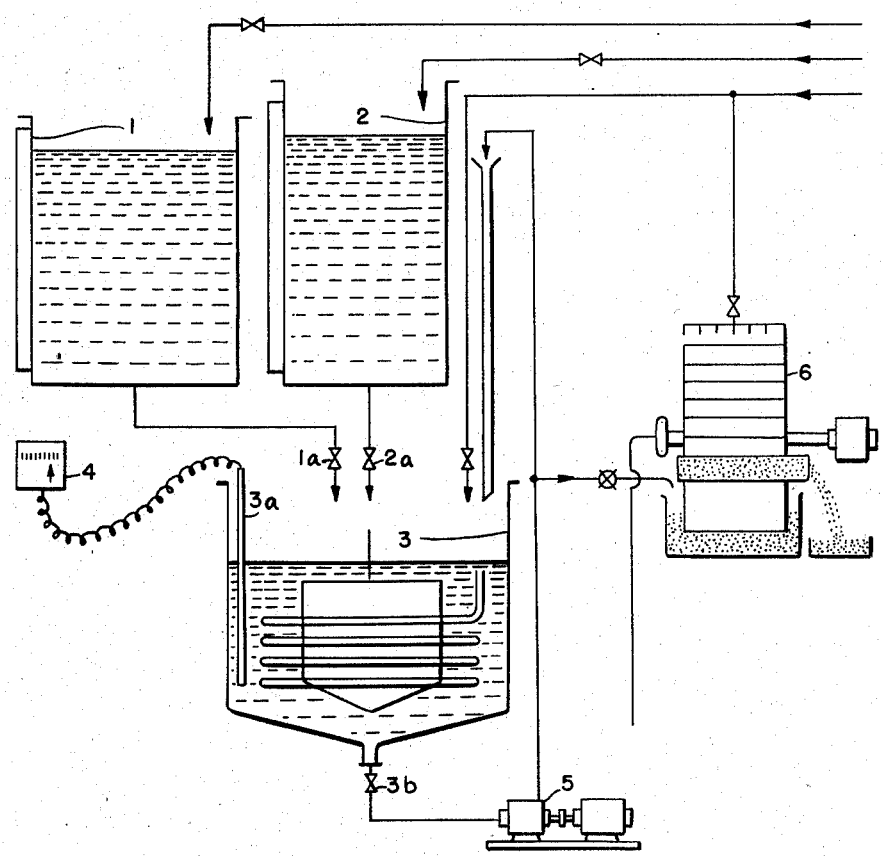

Oct. 6, 1959 W. ZIESE ET AL 2,907,634
PRODUCTION OF COLLOIDALLY SOLUBLE
ALUMINUM HYDROXIDE
Filed Sept. 11, 1956 2 Sheets-Sheet 1

INVENTORS:
WALTER ZIESE
WILHELM CHORBACHER
ADOLF STEINHOFER

ATT'YS

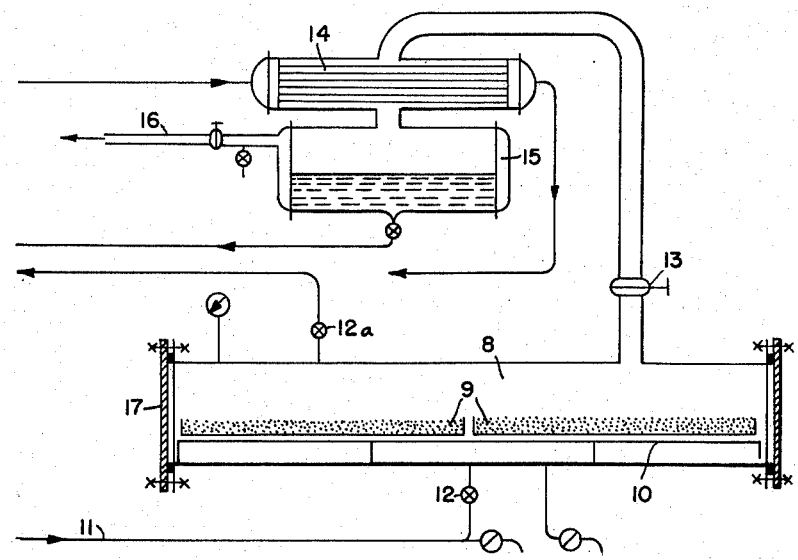

United States Patent Office 2,907,634
Patented Oct. 6, 1959

2,907,634

PRODUCTION OF COLLOIDALLY SOLUBLE ALUMINUM HYDROXIDE

Walter Ziese, Ludwigshafen (Rhine), Wilhelm Chorbacher, Neustadt/Haardt, and Adolf Steinhofer, Ludwigshafen (Rhine), Germany, assignors to Badische Anilin- & Soda-Fabrik Aktiengesellschaft, Ludwigshafen (Rhine), Rheinland-Pfalz, Germany Application September 11, 1956, Serial No. 609,285

Claims priority, application Germany October 5, 1955

7 Claims. (Cl. 23—143)

This invention relates to the production of aluminum hydroxide which is colloidally soluble in water, which has a high content of aluminum oxide and which has a very low content of acid radical.

It is known that aluminum hydroxide which is colloidally soluble in water can be obtained by peptizing suitable precipitated aluminum hydroxide with a small amount of an acid and evaporating the resultant sol to dryness. Other known methods consist in allowing metallic aluminum, preferably in the form of a weak amalgam, to act on aluminum salt solutions or dilute monobasic mineral acids, or decomposing aluminum alcoholates with dilute acids. It has also been proposed to prepare water-soluble alumina by electrolysis of aluminum chloride solutions, the sol of the alumina being formed in the cathode chamber, or by leading ethylene oxide into aluminum chloride solutions in order to abstract chlorine ions from these solutions with the formation of a sol, the ethylene oxide thereby being converted to ethylene chlorhydrin, removing the ethylene chlorhydrin by distillation and evaporating the solution to dryness.

A great disadvantage of the said methods of operation consists in the fact that in order to achieve good water-solubility of the alumina gel, a relatively high percentage of an inorganic, or in some cases an organic, acid radical must remain in the alumina gel as a peptizing agent. In the peptizing process there is required 5 to 10% of the amount of acid which is necessary for the production of the corresponding aluminum salt solution. In the production of water-soluble alumina by dissolving aluminum in aluminum salt solutions, in the electrolytic method and in the method making use of ethylene oxide, amounts of even 15 to 17% of the amount of acid necessary for the production of the salts are necessary. The end products are therefore highly basic salts of aluminum. It is also a disadvantage of the said methods that a sol must first be prepared, which may also be pasty-viscous, and that this sol must be converted in vaporizing apparatus, or drying apparatus, such as spray towers, roller driers or vacuum driers, into the water-soluble gel, it being necessary to evaporate considerable amounts of water.

We have now found that aluminum hydroxide which is colloidally soluble in water, which has a high content of aluminum oxide and which has a very low content of acid radicals can be prepared in a practically dry form by subjecting, preferably in the dry state, to a treatment with steam under pressure an aluminum hydroxide which contains small amounts of basic aluminum salts of strong acids, especially strong inorganic or mineral acids including nitric acid or hydrochloric acid. Advantageously the said basic aluminum salt is present in amounts corresponding to a content of about 0.1 to 5 percent by weight of the acid in the aluminum hydroxide to be used. It is preferable to start from an aluminum hydroxide precipitate which has been prepared from an alkali aluminate solution and a strong inorganic or mineral acid or from an aluminum salt solution of a strong inorganic acid, said aluminum salt solution having an aluminum content of preferably 50 to 150 grams per liter. For example it has been found that a precipitate prepared from a solution of a sodium aluminate having a molecular ratio $Na_2O:Al_2O_3=1.46:1$ by precipitation with nitric acid at pH=7 and at a temperature of 40° to 50° C. and which consists predominantly of the aluminum hydroxide boehmite, still contains 1 to 2% of $HNO_3$ with reference to dry substance. This small amount of acid is not sufficient to produce directly a peptizing action according to the methods hitherto known without the addition of further acid. Its peptizing action is, however, sufficiently strong if the aluminum hydroxide, preferably in dry form, is treated according to this invention with steam under pressure. The method is not applicable to precipitates for the production of which there have been used weak acids. Thus precipitates which have been prepared from aluminate solutions with carbon dioxide cannot be peptized by the treatment with steam. Aluminum hydroxide "stirred out" from aluminate solutions according to the Bayer method is also not peptizable by the method according to this invention. It is still not peptizable even when small amounts of acid are added to the aluminum hydroxide. Only the known conversion of the hydrargillite into boehmite can be achieved under these conditions. Accordingly it is not every synthetically-prepared boehmite which is peptizable.

The process is preferably carried out by first freeing from adherent salts on filter presses or rotary filters the aluminum hydroxide prepared by precipitation, drying it and grinding it and then treating the powder thus prepared with steam at 5 to 12 excess atmospheres. It is possible to work with steam under a lower pressure, but in this case longer treatment times are necessary and there is the risk that only part of the alumina will be rendered water-soluble to the desired extent. For the treatment with steam, the aluminum hydroxide can be spread out on stainless steel plates and these plates arranged on gratings and introduced into an externally insulated pressure-tight treatment chamber. Into the treatment chamber there is then led medium pressure steam until pressure equalization has been achieved. After action with the steam has continued for 1 to 10 hours, it is decompressed into a low pressure steam network or the heat content of the steam is utilized in some other way. The product removed from the treatment chamber usually dries out sufficiently in the air. The treatment chamber, after decompression, may however also be evacuated in order to achieve a better removal of moisture from the gel. The steam withdrawn, when using a water jet pump, can be precipitated into the water or, when using some other arrangement, condensed in a condenser. Since the product more or less agglomerates during the steam treatment, it is ground if necessary. The finished product has a content of water-soluble alumina of 80 to 85% which has hitherto been unattainable by other methods.

The invention will now be further described with reference to the accompanying drawings in which two embodiments of apparatus suitable for carrying out the process of the invention are shown diagrammatically.

A precipitation container 3, which is provided with a stirrer and a cooling coil, is charged with such an amount of water that it is embraced by the stirrer and moved vigorously. Nitric acid of the specific gravity $d=1.25$ flows from a container 1 and sodium aluminate solution of the specific gravity $d=1.35$ (ratio of $Na_2O:Al_2O_3=1.46:1$) simultaneously from a container 2 through valves 1a and 2a into the precipitating container 3, the temperature in the container 3 being kept at about 40° to 50° C. and the maintenance of a pH value of 7.0 to 7.3 in the precipitation medium being controlled by means of an antimony electrode 3a and a pH recorder 4.

When the precipitation is complete, the contents of the container 3 are supplied through a valve 3b by means of a pump 5 to a rotary filter 6. The aluminum hydroxide formed is separated on the rotary filter from the solution and washed with water of a temperature of 30° to 40° C.: for the substantially complete removal of the salts, it is again suspended in the precipitation container 3 and again supplied to the rotary filter 6. The filter-moist mass is dried at 100° to 110° C. and then ground. The product thus obtained contains 70 to 73% of $Al_2O_3$ and, with reference to dry substance, 1.2% of nitric acid combined with aluminum, which corresponds to 0.33% of the amount of acid which would be necessary to form aluminum nitrate.

The further working up is effected in the pressure-tight tube 8 shown in Figure 2. The product is spread out on stainless steel plates 9 which rest on a grate 10 in the tube 8. By opening a valve 12, the tube 8 is charged with steam at 10 to 12 excess atmospheres from a steam pipe 11. This pressure is maintained in the tube 8 for five hours, whereupon valve 12 is closed and a decompression valve 12a opened. After decompression, the slide 13 is opened to provide communication through a condenser 14 and a receiver 15 with a vacuum pipe 16. The tube 8 is allowed to cool under reduced pressure, the water adhering to the aluminum oxide thereby evaporating. After opening the lid 17, the aluminum hydroxide is removed and if necessary ground. Its content of $Al_2O_3$ in water-soluble forms amounts to 80 to 85%. Instead of using aluminum hydroxide which has been produced by the above-mentioned method from sodium aluminate solution, it is also possible to use aluminum hydroxides which have been precipitated from aluminum salt solutions, as for example from aluminum chloride solutions, with bases, such as caustic soda solution.

We claim:

1. A process for the production of aluminum hydroxide which is colloidally soluble in water, which has an aluminum oxide content above about 80% and an acid radical content of less than 5% which comprises precipitating aluminum hydroxide from a solution of a water-soluble aluminum compound in the presence of anions of strong inorganic acids by adjustment of the pH to not less than 7 but less than about 7.5, separating the precipitated alumina hydrate from the solution, washing the said precipitate to substantially remove the contaminant salts, said precipitate after washing containing from 0.1 to 5% by weight of the precipitate in the dried state of residual mineral acid radicals not removed by said washing step and treating the said substantially dewatered precipitate with steam under pressure.

2. A method of preparing aluminum hydroxide which is colloidally soluble in water which comprises subjecting precipitated aluminum hydroxide containing from about 0.1 to about 5.0% of anions of strong inorganic acids to the action of steam under a pressure of from about 5 to about 12 excess atmospheres for from about one to about ten hours.

3. A method as in claim 2 wherein the aluminum hydroxide has been precipitated from an alkali aluminate solution by the addition of a strong inorganic acid.

4. A method as in claim 2 wherein the aluminum hydroxide has been precipitated from an aluminum salt solution of a strong inorganic acid by the addition of a base.

5. A method as in claim 2 wherein the aluminum hydroxide which is to be subjected to the action of steam under pressure is boehmite.

6. A method as in claim 2 wherein said strong inorganic acids are selected from the group consisting of nitric acid and hydrochloric acid.

7. A method as in claim 2 wherein the aluminum hydroxide is dried before it is subjected to the action of steam under pressure.

References Cited in the file of this patent

UNITED STATES PATENTS

| | | |
|---|---|---|
| 1,632,829 | Fleissner | June 21, 1927 |
| 1,868,499 | Guertler | July 26, 1932 |
| 2,377,547 | Fuchs | June 5, 1945 |
| 2,378,155 | Newsome | June 12, 1945 |
| 2,390,272 | Riesmeyer et al. | Dec. 4, 1945 |
| 2,657,115 | Ashley | Oct. 27, 1953 |
| 2,667,404 | Haensel | Jan. 26, 1954 |
| 2,773,842 | Kimberlin | Dec. 11, 1956 |
| 2,776,188 | Gilbert | Jan. 1, 1957 |